United States Patent
Mattioli

(10) Patent No.: US 11,699,016 B2
(45) Date of Patent: *Jul. 11, 2023

(54) PASSIVELY COOLING HARDWARE COMPONENTS

(71) Applicant: Goldman Sachs & Co. LLC, New York, NY (US)

(72) Inventor: Michael Mattioli, Staten Island, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,352

(22) Filed: Apr. 21, 2022

(65) Prior Publication Data

US 2022/0245320 A1    Aug. 4, 2022

Related U.S. Application Data

(63) Continuation of application No. 17/077,361, filed on Oct. 22, 2020, now Pat. No. 11,341,307.

(51) Int. Cl.
*G06F 30/30* (2020.01)
*G06F 1/20* (2006.01)
(Continued)

(52) U.S. Cl.
CPC .............. *G06F 30/392* (2020.01); *G06F 1/20* (2013.01); *G06F 30/27* (2020.01); *G06F 30/31* (2020.01);
(Continued)

(58) Field of Classification Search
None
See application file for complete search history.

(56) References Cited

U.S. PATENT DOCUMENTS

| | | | |
|---|---|---|---|
| 7,114,132 B2* | 9/2006 | Yaguchi | G06F 30/367 716/139 |
| 7,423,871 B2* | 9/2008 | Schwab | H05K 7/20918 165/104.33 |

(Continued)

FOREIGN PATENT DOCUMENTS

| | | |
|---|---|---|
| CN | 111079370 A | 4/2020 |
| JP | 06169199 A | 6/1994 |

(Continued)

OTHER PUBLICATIONS

PCT International Search Report and Written Opinion, PCT Application No. PCT/IB2021/054719, dated Aug. 31, 2021, nine pages.

(Continued)

*Primary Examiner* — Leigh M Garbowski
(74) *Attorney, Agent, or Firm* — Fenwick & West LLP

(57) ABSTRACT

A system and a method are disclosed for placing hardware components on a printed circuit board ("PCB") in a way that enables all hardware components on the PCB to be passively cooled without using active cooling systems. Components are selected to be placed onto the PCB and heat metrics for each component is obtained (e.g., from a server). The components are ranked based on the amount of heat that each component generates. A corresponding position for each of the hardware components is determined based on the ranking of the components and the orientation of the PCB. The placement is based on the concept that air having higher temperature rises while air having cooler temperature falls. A representation of the PCB according to corresponding positions of the hardware components may be generated for display.

17 Claims, 5 Drawing Sheets

(51) Int. Cl.
  *H05K 3/00* (2006.01)
  *G06F 30/392* (2020.01)
  *G06F 30/31* (2020.01)
  *G06F 30/27* (2020.01)
  *G06F 115/12* (2020.01)
  *G06F 111/20* (2020.01)
  *G06F 119/08* (2020.01)

(52) U.S. Cl.
  CPC ........ *H05K 3/0005* (2013.01); *G06F 2111/20* (2020.01); *G06F 2115/12* (2020.01); *G06F 2119/08* (2020.01)

(56) References Cited

U.S. PATENT DOCUMENTS

| | | | |
|---|---|---|---|
| 7,742,298 | B2 | 6/2010 | Kunz |
| 8,373,990 | B2 * | 2/2013 | Jarmany ............ H05K 7/20445 361/752 |
| 8,645,900 | B2 | 2/2014 | Schroeder et al. |
| 9,317,643 | B2 | 4/2016 | Ferrill et al. |
| 9,461,826 | B2 | 10/2016 | Kreft |
| 10,831,939 | B2 | 11/2020 | Christo et al. |
| 11,341,307 | B2 * | 5/2022 | Mattioli .................. G06F 30/27 |
| 2018/0237138 | A1 | 8/2018 | Phan et al. |
| 2019/0140852 | A1 | 5/2019 | Kreft |
| 2020/0184034 | A1 | 6/2020 | Christo et al. |
| 2021/0195752 | A1 | 6/2021 | Lin |

FOREIGN PATENT DOCUMENTS

| | | |
|---|---|---|
| JP | 06290234 A | 10/1994 |
| JP | 06301746 A | 10/1994 |
| JP | H09212535 A | 8/1997 |
| JP | 2016153956 A | 8/2016 |

OTHER PUBLICATIONS

Taiwan Intellectual Property Office, Office Action, Taiwan Patent Application No. 110126112, dated Jun. 2, 2022, 10 pages, (with explanation of relevance).

United States Office Action, U.S. Appl. No. 17/077,361, filed Nov. 12, 2021, 10 pages.

* cited by examiner

PASSIVELY COOLING HARDWARE COMPONENTS

CROSS-REFERENCE TO RELATED APPLICATION

This application is a continuation of U.S. patent application Ser. No. 17/077,361 filed on Oct. 22, 2020, which is incorporated by reference in its entirety.

TECHNICAL FIELD

The disclosure generally relates to the field of passively cooling hardware components.

BACKGROUND

Hardware components in computer systems produce heat as those components process information. As those hardware components get more complex, they generate more heat and if that heat is not properly dissipated, those hardware components overheat and eventually fail. To solve this problem, builders, designers, and others started adding active cooling systems to processing systems, including fans and water cooling. However, those systems add complexity to hardware design and can also draw a large amount of power. Because active cooling systems have various moving parts, those systems break down causing one or more hardware components to overheat and fail, in many cases, without a user knowing of the break-down. For example, cooling fans attached to hardware components fail for various reasons, including when spinning mechanisms fail. Hardware components protected by those fans overheat and fail. In another example, water cooling systems have an even greater potential for damage. When water carrying components fail, the whole enclosure can become wet, in many instances, destroying all hardware components that become wet.

SUMMARY

To solve the above, each hardware component may be placed on a printed circuit board ("PCB") in a way that enables all hardware components on the PCB to be passively cooled without using active cooling systems. Although not all devices can be passively cooled in this manner (e.g., large servers), many devices (e.g., monitors) can be. A system including software and/or hardware elements may be used for assigning hardware components to certain positions on the PCB. That system may be referred to as a component placement system. The component placement system may receive, for example, as input from a user, information for various components to be placed on the PCB (e.g., a video processor, memory, and/or other suitable components). The component placement system may use the received information to obtain data on amounts if heat each component generates. For example, the component placement system may obtain heat metrics from a server for each of the components.

When the component placement system receives the heat metrics, the component placement system may rank the hardware components based on the amount of heat that each component generates. The system may then determine a corresponding position for each of the hardware components based on the ranking of the components and the orientation of the PCB. The placement is generally based on the concept that air having higher temperature, rises while air having cooler temperature falls. The system may generate for display a representation of the PCB according to corresponding positions of the hardware components.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
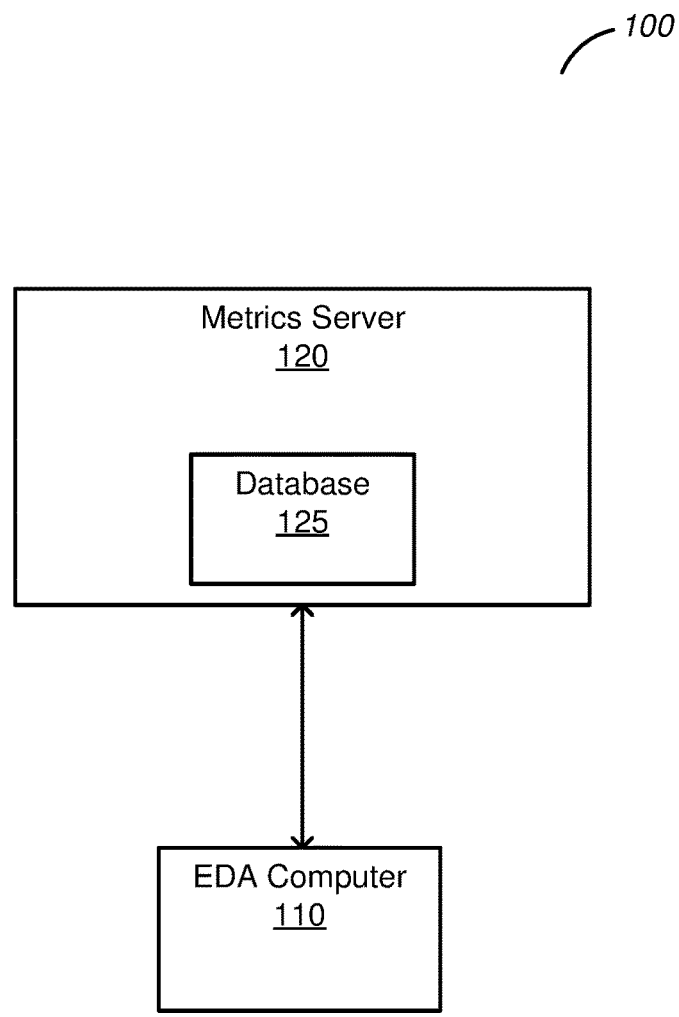
FIG. 1 illustrates one embodiment of a system for positioning passively cooled components on a PCB.

Disclosed herein are a system, method and computer readable storage medium for positioning passively cooled components on a printed circuit board. FIG. 1 illustrates components of an exemplary component placement system. FIG. 1 illustrates electronic design automation ("EDA") computer 110 that may host a portion of the component placement system. EDA computer 110 may take input from a user (e.g., via a keyboard, mouse and/or a touch display) and perform various actions that will be described further below. EDA computer 110 may be any suitable computing device (e.g., personal computer, laptop, smart phone, electronic tablet, or another suitable computing device). FIG. 1 also illustrates metrics server 120 that includes database 125. EDA computer 110 may communicate with metrics sever 120 to obtain data associated with components that are part of the EDA design (e.g., heat metrics). Metrics server 120 may store component data (e.g., in database 125) and transmit various component data to EDA computer 110 responsive to requests originating from EDA computer 110.

Computing Machine Architecture

Figure 2:
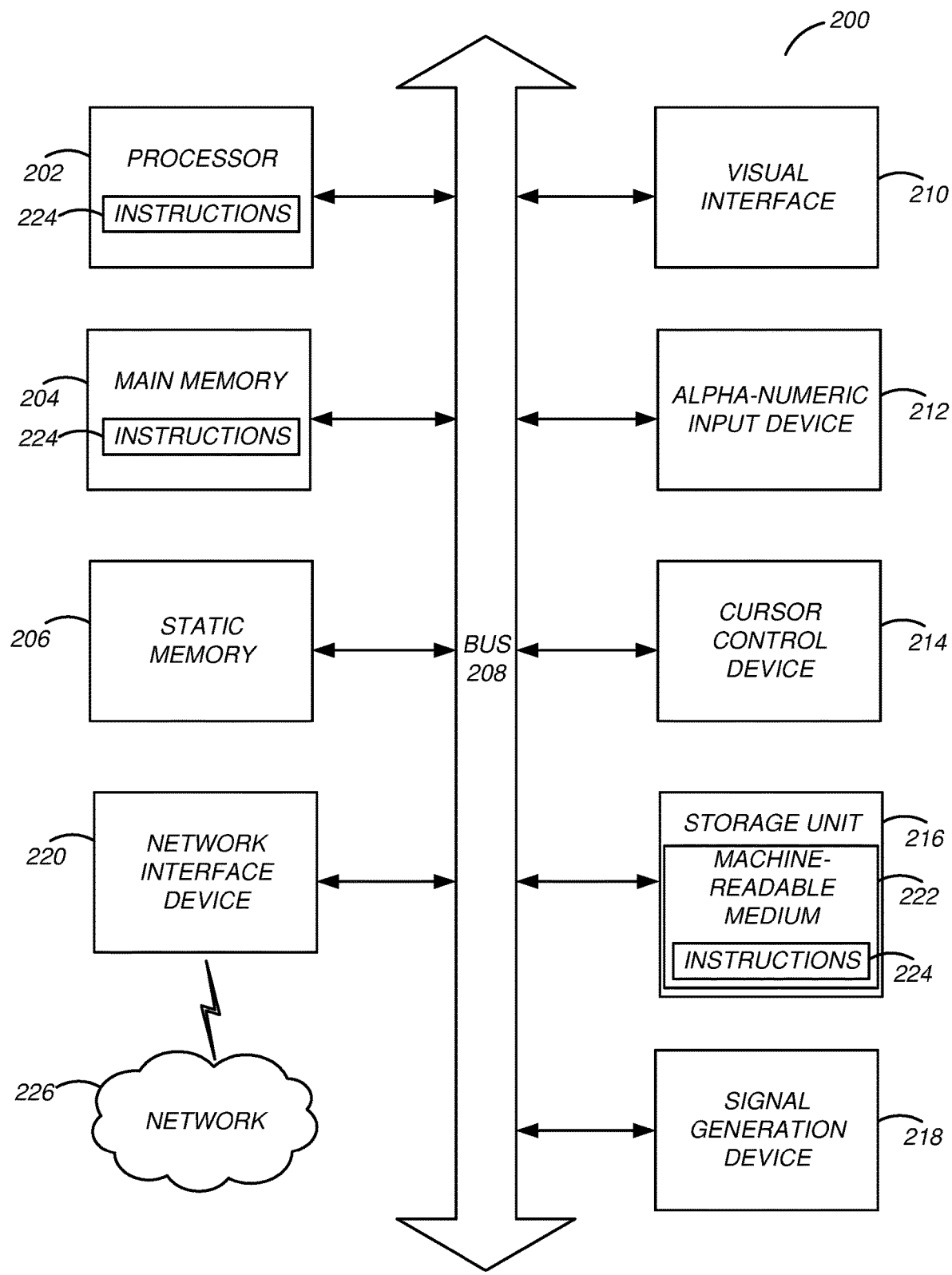
FIG. 2 is a block diagram illustrating components of an example machine able to read instructions from a machine-readable medium and execute them in a processor (or controller).
Figure 3:
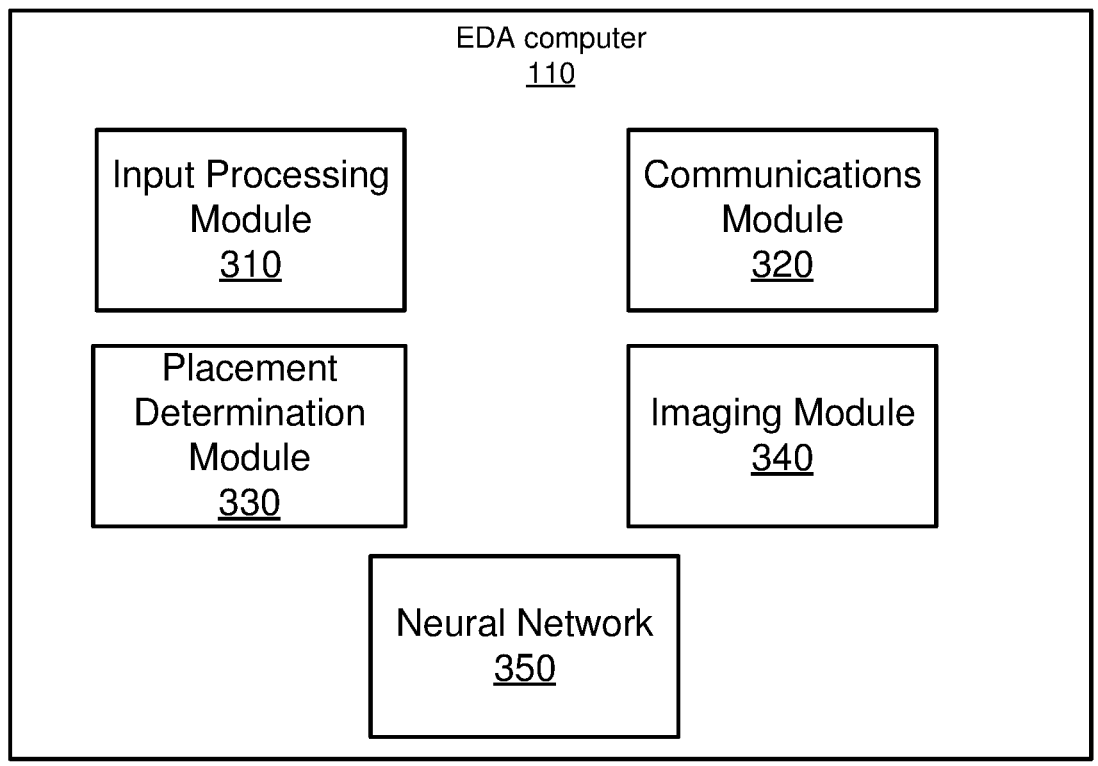
FIG. 3 illustrates one embodiment of exemplary modules for positioning passively cooled components on a PCB.

EDA computer 110 and metrics server 120 may include various software and hardware shown in FIG. 2. FIG. (FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which program code (e.g., software) for causing the machine to perform any one or more of the methodologies discussed herein may be executed. The program code may be comprised of instructions 224 executable by one or more processors 202. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include visual display interface 210. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 210 may include or may interface with a touch enabled screen. The computer system 200 may also include alpha-numeric input device 212 (e.g., a keyboard or touch screen keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Component Placement System

A portion of the component placement system may be hosted on EDA computer 110. EDA computer 110 may host input processing module 310, communications module 320, placement determination module 330, and imaging module 340. EDA computer 110 may host more or less modules. In some embodiments, one or more of these modules may be hosted on a different computer system. For example, imaging module 340 may be hosted on another computer system.

Input processing module 310 may receive input originating from a user. For example, input processing module 310 may receive input from alpha-numeric input device 212 and/or cursor control device 214. In some embodiments, EDU computer 110 may display a list of components for selection and receive a user selection of components to be placed onto the PCB. Each of these selections may be passed to input processing module 310. Input processing module 310 may extract an identifier for each selected component.

Once input is received, input processing module 310 may format the input into one or more requests for retrieving heat generation metrics for each hardware component. The one or more requests may include an identifier for each of the components. For example, input processing module 310 may receive selections of ten components to be placed onto a PCB. In some embodiments, input processing module 310 may generate ten requests (e.g., a request per component) and each request may include an identifier of the component. The identifier may be the name of the component, an alpha-numeric string uniquely identifying each component and/or another suitable identifier. In some embodiments, input process module 310 may generate a single request for all the components and include all the identifiers in the request. Input processing module 310 may format the one or more requests in a manner that enables the responding server to process the requests. In some embodiments, input processing module 310 may generate a request per type of component. For example, input processing module 310 may generate a single request for memory components, another request for processing components, and other request for other types of hardware components.

Input processing module 310 may pass the one or more requests to communications module 320. Communications module 320 may include software and/or hardware components. For example, communications module 320 may include network interface device 220 (FIG. 2) and software to use network interface device 220 for communications. When communications module 320 receives the one or more requests, communications module 320 may transmit that/those requests for heat generation metrics to a server (e.g., metrics server 120). In response to each request, communications module 320 may receive data for each hardware component that was selected. For example, communications module 320 may receive, in response to the request, values representing corresponding amounts of heat generated by each hardware component. The heat generation amounts may be in watts, which is a unit of measure for transferring one joule of heat per a second. In some embodiments, the values may be in other units. In addition, communications module 320 may receive other information in response to the request. For example, communications module 320 may receive dimensions of each hardware component, maximum operating temperature, and/or other information. Communications module 320 may pass the received information to placement determination module 330.

Placement determination module 330 may receive the information and determine, based on the values representing amounts of heat generated by the hardware components, a ranking for each of the hardware components. For example, placement determination module 330 may iterate through each component and retrieve the amount of heat each component generates (e.g., a number of watts). Placement determination module 330 may rank the components based on the retrieved number of watts and store the rankings in a data structure together with other data (if any) for each hardware component.

Generally, based on gas law, gases having a relatively higher temperature rise above gases having a relatively lower temperature. This may be explained by the fact that when air molecules become hotter, they move faster and thus, move apart. As a result, hotter air becomes less dense and therefore "floats up" above denser (cooler) air. This concept can be quantified with an equation:

$$A_h = g\left(\frac{\Delta T}{T}\right) \qquad \text{Equation 1}$$

where $A_h$ is acceleration of relatively hot air, g a value representing the force of gravity, $\Delta T$ is a temperature difference between surrounding air and the hotter air, and T is the temperature of the surrounding air.

Placement determination module 330 may use the equation to determine whether hot air can accelerate up at a rate fast enough so that each component on the PCB does not overheat. For example, placement determination module 330 may use the constant value for g, a constant value for T (e.g., expected room temperature or highest expected room temperature) and a difference between the surrounding temperature and the temperature rise that each component causes when it operates as $\Delta T$. Thus, placement determination module 330 may determine how fast air will accelerate up when hardware components are operational (e.g., producing maximum heat). When a hardware component is placed near the relative bottom of the PCB and the heat it produces heats up the air around the hardware component, that hotter air rises (e.g., towards an opening at the top of an enclosure) and further heats up air near other hardware components that are placed relatively higher on the PCB.

Figure 4:
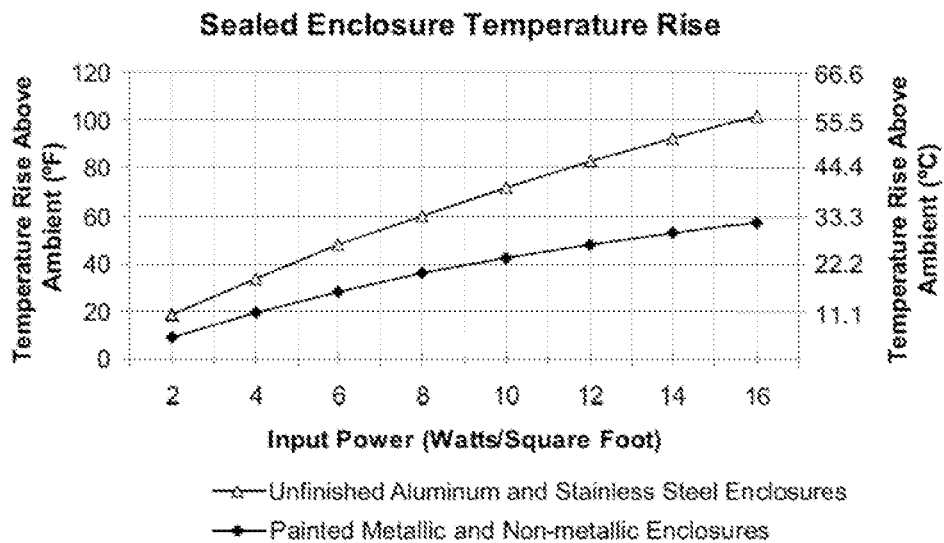
FIG. 4 illustrates a graph for relating input power per square foot and temperature rise.

Placement determination module 330 may determine $\Delta T$ based on how much heat each component produces. Generally, it is known that in a sealed enclosure temperature rises faster as more heat (e.g. in watts) is produced by the hardware components. FIG. 4 illustrates a graph that shows two curves that describe how ambient temperature rises relative to amount of heat generated per surface area (e.g., watt per square foot). Based on the graph in FIG. 4 or another suitable graph, heat generation metrics, and dimensions of each hardware component, placement determination module 330 may determine temperature rise around each hardware component.

As discussed above, when heat is generated by hardware components placed near a bottom edge of the PCB, hot air will rise and add to the heat around relatively higher placed hardware components. Placement determination module 330 may also determine which of the other hardware components can be placed above so that the combination of hot air rising from the bottom hardware components and the temperature rise based on the heat generation by each of the other hardware components does not cause the temperature around each of the components to rise above maximum operating temperature of each corresponding component. That is, placement determination module 330 may determine (e.g., using Equation 1 and graph of FIG. 4) whether the rise in temperature around the relatively higher placed hardware components (on the PCB) will cause those components to fail because the temperature around one or more of those components will rise above the maximum operating temperature and/or stay above the maximum operating temperature for prolonged periods of time.

If placement determination module 330 determines that the temperature will rise above the maximum operating temperature and/or stay above the maximum operating temperature for a prolonged period of time, placement determination module 330 may place components in different positions (e.g., relative to each other and relative to the bottom edge of the PCB). For example, if a first hardware component with the highest or high heat generation value that is placed near the bottom edge of the PCB, produces an amount of heat that changes the temperature of the surrounding air to a number that is close to the maximum operating temperature of the second hardware component located above, the combination of this temperature rise and temperature rise caused by the heat generated by the second hardware component may cause the temperature around the second component to be higher than the maximum operating temperature of that hardware component. Thus, placement determination module 330 may place a different component in that location instead of the second hardware component.

Placement determination module 330 may use various methods for placing components using the principle that components generating higher amounts of heat should be placed lower on a PCB. For example, placement determination module 330 may identify a lower edge of the PCB based on the orientation of the PCB when the PCB is placed in the enclosure. In some embodiments, orientation of the PCB may be supplied by the user (e.g., via user input). Placement determination module 330 may access that user input and retrieve the orientation information. Placement determination module 330 may select one or more highest ranked hardware components according to the ranking (e.g., ranking based on heat metrics). For example, placement determination module 330 may determine whether there is enough horizontal space on the PCB to place multiple hardware components (e.g., hardware components with highest ranks) near the bottom edge of the PCB. For example, placement determination module 330 may extract dimensions of each of the highest ranked hardware components and compare those dimensions with the dimensions of the PCB. Based on the comparison, placement determination module 330 may determine whether one or more hardware components can be placed along the bottom/lower edge of the PCB. Placement determination module 330 may select one or more of the highest ranked components to placed along the lower/bottom edge of the PCB and assign those components to be placed along that bottom edge.

In some embodiments, placement determination module 330 may determine the ranking for each of the hardware components by taking the following actions. Placement determination module 330 may select one or more hardware components associated with a highest amount of generated heat. For example, placement determination module 330 may access a data structure in memory that includes information about each of the hardware components and iterate through the data structure to identify the component or components with the highest amount of generated heat. Placement determination module 330 may then assign a highest ranking to the one or more hardware components associated with the highest amount of generated heat.

Placement determination module 330 may continue the process until all hardware components are placed on the PCB. When placement determination module 330 completes the placement process, it may pass a data structure with the placement information to imaging module 340. Imaging module 340 may generate for display a representation of the PCB and the plurality of hardware components according to corresponding positions of the plurality of hardware components.

Figure 5:
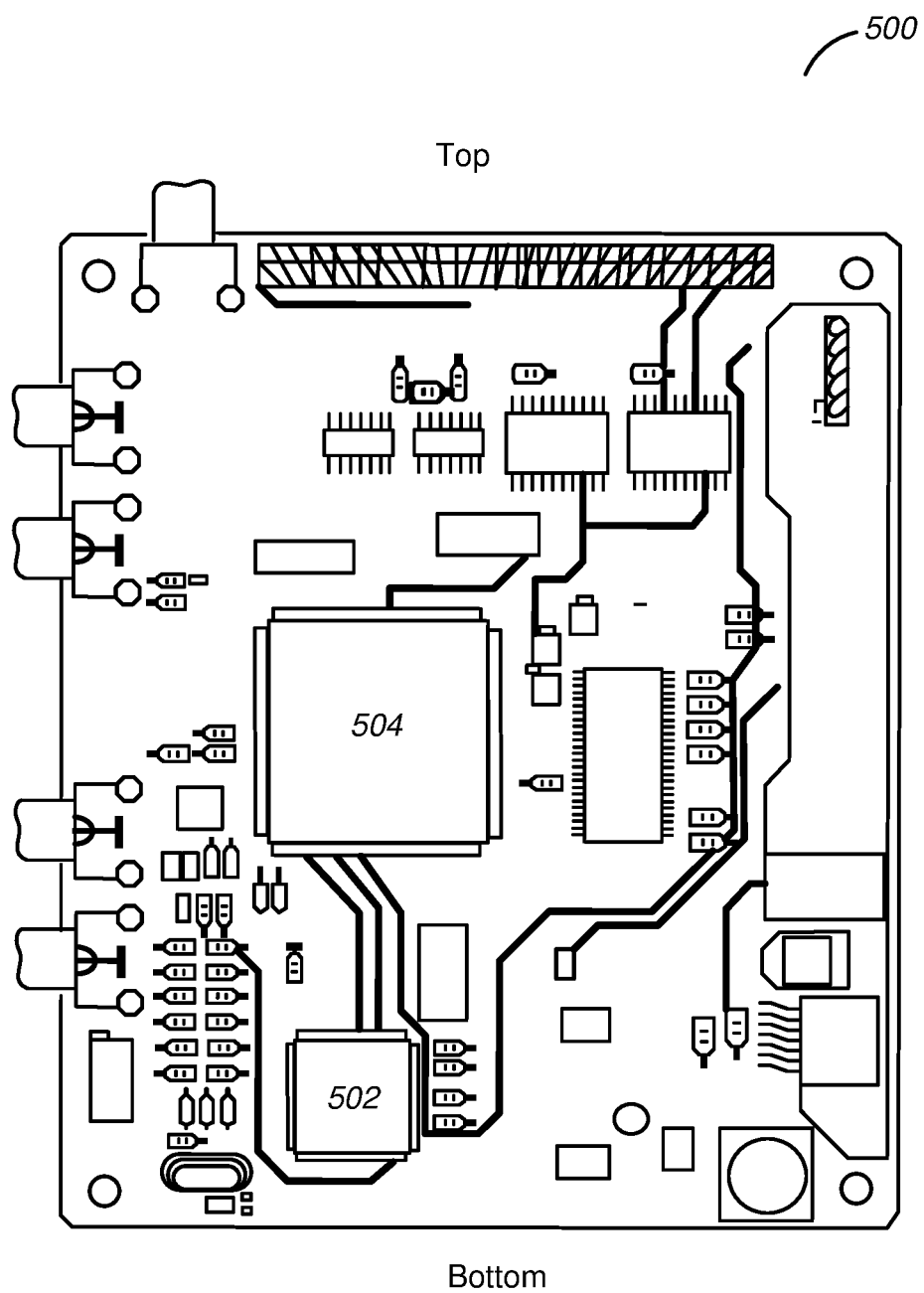
FIG. 5 illustrates one possible placement of components on a PCB.

FIG. 5 illustrates one possible placement of components on a PCB. Imaging module 340 may generate for display drawing 500 corresponding to the PCB and the hardware components on the PCB. Hardware component 502 may be one of the components generating a higher and/or high amount of heat, thus, placement determination module 330 may place hardware component 502 near the bottom edge of the PCB. Hardware component 504 may be a component that generates a smaller amount of heat (e.g., in comparison to hardware component 502). Thus, placement determination module 330 may place hardware component 504 higher on the PCB relative to hardware component 502. In addition, placement determination module 330 may have determined that the temperature rise from heat generated from hardware component 504 combined with heated air accelerating up from around hardware components 502 does not raise the temperature of air around hardware component 504 beyond the maximum operating temperature of hardware component 504. Therefore, placement determination module 330 may have placed hardware components 502 and 504 in their respective positions on the PCB.

The PCB in FIG. 5 may be placed in an enclosure (not shown) with other components of a system. For example, the PCB may be placed into the same enclosure with a display screen creating a monitor. The enclosure may have slits positioned at a location corresponding to the top of the PCB so that heated air can "escape" the enclosure through those slits (not shown). In some embodiments, the enclosure may have slits positioned in a location near the bottom of the PCB so that cooler air (e.g., air of room temperature) can enter the enclosure through those slits.

In some embodiments, the component placement system may receive the amounts of heat generated by the hardware components in one or more data structures. Each data structure may include an identifier of a corresponding hardware component (e.g., the same identifier sent in the request) and a heat value representing an amount of heat that the corresponding hardware component generates. The heat value may be in watts or another suitable unit. In some embodiments, the component placement system may receive one data structure per hardware component. In some embodiments, these data structure may be combined into a larger data structure including data for multiple (e.g., all) hardware components requested. In some embodiments, the data structure may include a temperature value indicating a maximum operating temperature of a corresponding hardware component. The temperature may be in Fahrenheit, Celsius, Kelvin, or in another suitable scale.

In some embodiments, placement determination module 330 may assign the corresponding location on the PCB for each of the hardware components using machine learning methods. For example, placement determination module 330 may input attributes of each of the hardware components into a neural network 350. The attributes may include one or more of the heat generation metrics of each hardware component, dimensions of each the plurality of hardware components, and/or dimensions of the PCB. The neural network 350 may process the input and output the result. Placement determination module 330 may receive, from the neural network 350, an arrangement for the plurality of hardware components. For example, the placement arrangement may include data on where to place components 502 and 504 (FIG. 5).

In some embodiments, placement determination module 330 may be used to train the neural network 350. For example, placement determination module 330 may access a location with stored attributes of hardware components and corresponding placements on a PCB. Placement determination module 330 may input that data into a neural network to train the neural network 350.

Figure 6:
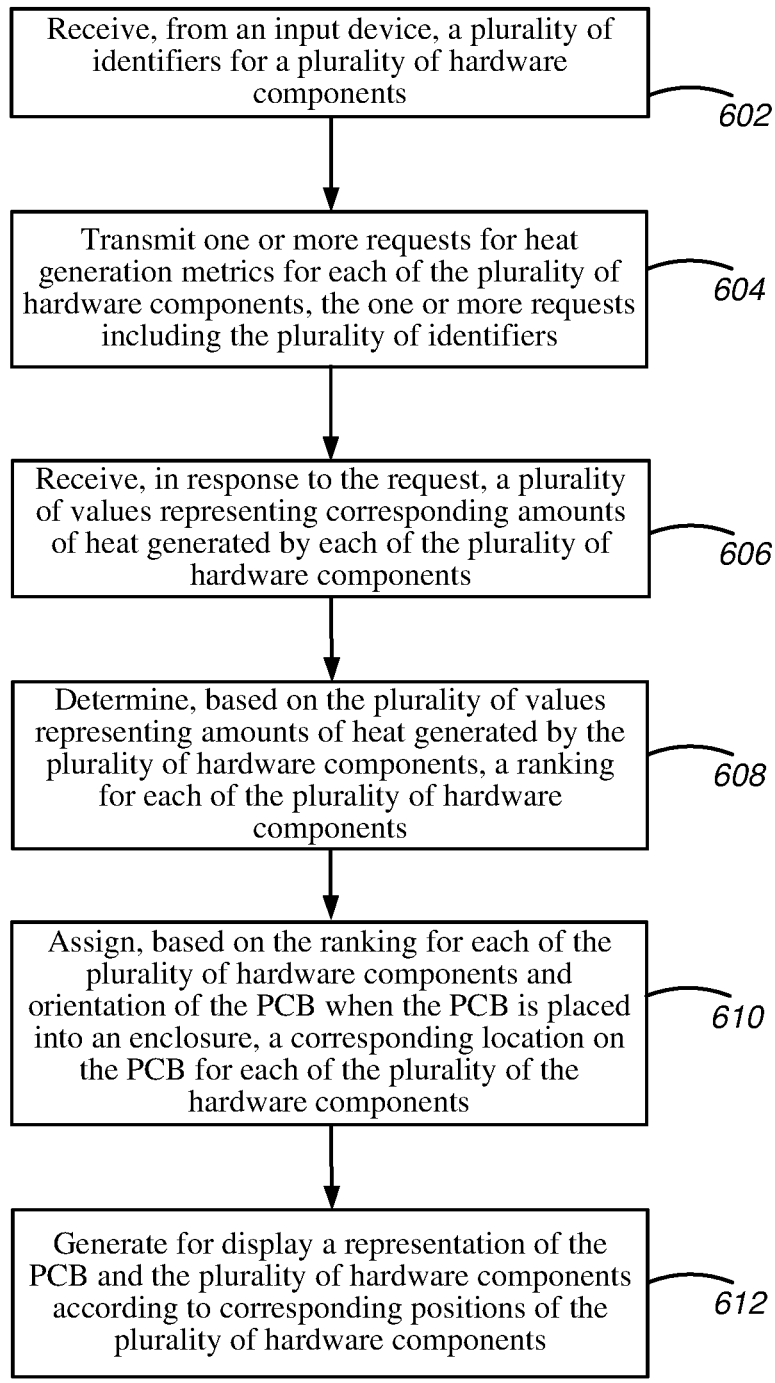
FIG. 6 illustrates one embodiment of an exemplary flow chart for positioning passively cooled components on a PCB.

FIG. 6 illustrates one embodiment of an exemplary flow chart for positioning passively cooled components on a PCB. At 602, EDA computer 110 receives, from an input device, a plurality of identifiers for a plurality of hardware components. EDA computer 110 may include one or more components recited in associated with FIG. 2. EDA computer 110 may receive input via alpha-numeric input device 212 and/or via cursor control device 214. In some embodiments, EDA computer 110 may generate for display, via visual interface 210, a number of choices for selecting hardware components to be included on the PCB. EDA computer 110 may receive user input of the selections.

At 604, EDA computer 110 transmits one or more requests for heat generation metrics for each of the plurality of hardware components, the one or more requests including the plurality of identifiers. EDA computer 110 may use network interface device 220 to transmit the identifiers to metrics server 120 via network 226. At 606, EDA computer 110 receives, in response to the request, a plurality of values representing amounts of heat generated by the plurality of hardware components. For example, EDA computer 110 may receive, from metrics server 120 via network 226, the amounts of heat using network interface device 220.

At 608, EDA computer 110 determines, based on the plurality of values representing amounts of heat generated by the plurality of hardware components, a ranking for each of the plurality of hardware components. For example, when the amounts of heat are received via network interface 220, those amounts of heat may be stored in main memory 204 and/or on a storage unit 216. Processor 202 may access the amounts of heat and iterate through them to determine one or more hardware components with the highest amount of heat.

At 610, EDA computer 110 assigns, based on the ranking for each of the plurality of hardware components and orientation of the PCB when the PCB is placed into an enclosure, a corresponding location on the PCB for each of the plurality of the hardware components. For example, process 202 may perform this operation using main memory 204 to store, for example, a neural network or other data which is used in the assignment operation. At 612, EDA computer 110 may generate for display a representation of the PCB and the plurality of hardware components according to corresponding positions of the plurality of hardware components. For example, EDA computer 110 may use visual interface 210 to perform this operation.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for passively cooling hardware components through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for positioning passively cooled components on a printed circuit board (PCB), the method comprising:
    receiving a plurality of identifiers of a plurality of hardware components, the plurality of hardware components configured to be placed on the PCB;
    determining a ranking for each of the plurality of hardware components based on heat generation metrics including a plurality of values representing amounts of heat generated by the plurality of hardware components;
    identifying a lower edge of the PCB based on an orientation of the PCB while the PCB is in an enclosure;
    selecting one or more highest ranked hardware components from the plurality of hardware components for assignment to locations along the lower edge of the PCB, the one or more highest ranked hardware components including the hardware component having a value representing a highest amount of heat amongst the plurality of hardware components;
    assigning each of the plurality of hardware components a corresponding location on the PCB based on the orientation of the PCB and a value from the plurality of values that represents an amount of heat generated by the hardware component, wherein the selected one or more highest ranked hardware components are assigned to a location along the lower edge of the PCB; and
    generating a representation of the PCB and the plurality of hardware components for display, the representation generated according to the assigned location of each of the plurality of hardware components.

2. The method of claim 1, further comprising:
    transmitting a request for heat generation metrics for the plurality of hardware components to a server, the one or more requests comprising the plurality of identifiers;
    receiving, from the server, the heat generation metrics including a plurality of values representing amounts of heat generated by the plurality of hardware components.

3. The method of claim 2, wherein assigning each of the plurality of hardware components the corresponding location on the PCB comprises:
    inputting attributes of each of the plurality of hardware components into a neural network, the attributes including at least one of the heat generation metrics of the plurality of hardware components, dimensions of each the plurality of hardware components, or dimensions of the PCB; and
    receiving, from the neural network, an arrangement for the plurality of hardware components on the PCB.

4. The method of claim 1, wherein the one or more highest ranked hardware components are initially assigned locations along the lower edge of the PCB further based on dimensions of each of the one or more highest ranked hardware components.

5. The method of claim 4, wherein assigning each of the plurality of hardware components comprises:

re-assigning at least one hardware component from the one or more highest ranked hardware components from locations along the lower edge of the PCB to locations other than the lower edge of the PCB responsive to determining that heat generated by the at least one hardware component will cause one or more of the plurality of hardware components to operate at a temperature that is greater than a maximum operating temperature of the one or more of the plurality of hardware components.

6. The method of claim 1, wherein receiving the plurality of identifiers of a plurality of hardware components comprises:
receiving a data structure for each of the plurality of values, the data structure for each of the plurality of values including an identifier of a corresponding hardware component and a heat value representing a corresponding amount of heat that the corresponding hardware component generates.

7. The method of claim 6, wherein the data structure further comprises a temperature value for a corresponding maximum operating temperature of the corresponding hardware component.

8. The method of claim 1, wherein ranking comprises:
selecting the hardware component having the value representing the highest amount of heat generated by the hardware components amongst the plurality of hardware components; and
assigning a highest ranking to the hardware component.

9. A non-transitory computer-readable medium comprising memory with instructions encoded thereon for positioning passively cooled components on a printed circuit board (PCB), the instructions when executed causing one or more processors to perform operations comprising:
receiving a plurality of identifiers of a plurality of hardware components, the plurality of hardware components configured to be placed on the PCB;
determining a ranking for each of the plurality of hardware components based on heat generation metrics including a plurality of values representing amounts of heat generated by the plurality of hardware components;
identifying a lower edge of the PCB based on an orientation of the PCB while the PCB is in an enclosure;
selecting one or more highest ranked hardware components from the plurality of hardware components for assignment to locations along the lower edge of the PCB, the one or more highest ranked hardware components including the hardware component having a value representing a highest amount of heat amongst the plurality of hardware components;
assigning each of the plurality of hardware components a corresponding location on the PCB based on the orientation of the PCB and a value from the plurality of values that represents an amount of heat generated by the hardware component, wherein the selected one or more highest ranked hardware components are assigned to a location along the lower edge of the PCB; and
generating a representation of the PCB and the plurality of hardware components for display, the representation generated according to the assigned location of each of the plurality of hardware components.

10. The non-transitory computer-readable medium of claim 9, wherein the instructions further cause the one or more processors to perform operations comprising:
transmitting a request for heat generation metrics for the plurality of hardware components to a server, the one or more requests comprising the plurality of identifiers;
receiving, from the server, the heat generation metrics including a plurality of values representing amounts of heat generated by the plurality of hardware components.

11. The non-transitory computer-readable medium of claim 10, wherein assigning each of the plurality of hardware components the corresponding location on the PCB comprises:
inputting attributes of each of the plurality of hardware components into a neural network, the attributes including at least one of the heat generation metrics of the plurality of hardware components, dimensions of each the plurality of hardware components, or dimensions of the PCB; and
receiving, from the neural network, an arrangement for the plurality of hardware components on the PCB.

12. The non-transitory computer-readable medium of claim 9, wherein the one or more highest ranked hardware components are initially assigned locations along the lower edge of the PCB further based on dimensions of each of the one or more highest ranked hardware components.

13. The non-transitory computer-readable medium of claim 12, wherein assigning each of the plurality of hardware components comprises:
re-assigning at least one hardware component from the one or more highest ranked hardware components from locations along the lower edge of the PCB to locations other than the lower edge of the PCB responsive to determining that heat generated by the at least one hardware component will cause one or more of the plurality of hardware components to operate at a temperature that is greater than a maximum operating temperature of the one or more of the plurality of hardware components.

14. The non-transitory computer-readable medium of claim 9, wherein receiving plurality of identifiers of a plurality of hardware components comprises:
receiving a data structure for each of the plurality of values, the data structure for each of the plurality of values including an identifier of a corresponding hardware component and a heat value representing a corresponding amount of heat that the corresponding hardware component generates.

15. The non-transitory computer-readable medium of claim 14, wherein the data structure further comprises a temperature value for a corresponding maximum operating temperature of the corresponding hardware component.

16. A system for positioning passively cooled components on a printed circuit board (PCB), the system comprising:
memory storing instructions; and
one or more processors configured to execute the instructions that cause the one or more processors to perform operations including:
receiving a plurality of identifiers of a plurality of hardware components, the plurality of hardware components configured to be placed on the PCB;
determining a ranking for each of the plurality of hardware components based on heat generation metrics including a plurality of values representing amounts of heat generated by the plurality of hardware components;
identifying a lower edge of the PCB based on an orientation of the PCB while the PCB is in an enclosure;

selecting one or more highest ranked hardware components from the plurality of hardware components for assignment to locations along the lower edge of the PCB, the one or more highest ranked hardware components including the hardware component having a value representing a highest amount of heat amongst the plurality of hardware components;

assigning each of the plurality of hardware components a corresponding location on the PCB based on the orientation of the PCB and a value from the plurality of values that represents an amount of heat generated by the hardware component, wherein the selected one or more highest ranked hardware components are assigned to a location along the lower edge of the PCB; and generating a representation of the PCB and the plurality of hardware components for display, the representation generated according to the assigned location of each of the plurality of hardware components.

17. The system of claim 16, wherein the instructions further cause the one or more processors to perform operations comprising:

transmitting a request for heat generation metrics for the plurality of hardware components to a server, the one or more requests comprising the plurality of identifiers;

receiving, from the server, the heat generation metrics including a plurality of values representing amounts of heat generated by the plurality of hardware components.

* * * * *

UNITED STATES PATENT AND TRADEMARK OFFICE
CERTIFICATE OF CORRECTION

PATENT NO. : 11,699,016 B2
APPLICATION NO. : 17/726352
DATED : July 11, 2023
INVENTOR(S) : Michael Mattioli It is certified that error appears in the above-identified patent and that said Letters Patent is hereby corrected as shown below:

In the Claims

In Column 12, in Claim 3, Line 57, delete "each the" and insert -- each of the --, therefor.

In Column 14, in Claim 11, Line 16, delete "each the" and insert -- each of the --, therefor.

Signed and Sealed this
Twenty-sixth Day of March, 2024

Katherine Kelly Vidal
*Director of the United States Patent and Trademark Office*